No. 759,874. PATENTED MAY 17, 1904.
O. C. FLETCHER.
SHOWER BATH HOSE.
APPLICATION FILED AUG. 31, 1903.
NO MODEL.

Witnesses:
John Braunwalder
L. J. Snow

Inventor:
Orland C. Fletcher
By Frederick Benjamin
Att'y

No. 759,874. Patented May 17, 1904.

UNITED STATES PATENT OFFICE.

ORLAND C. FLETCHER, OF CHICAGO, ILLINOIS.

SHOWER-BATH HOSE.

SPECIFICATION forming part of Letters Patent No. 759,874, dated May 17, 1904.

Application filed August 31, 1903. Serial No. 171,363. (No model.)

*To all whom it may concern:*

Be it known that I, ORLAND C. FLETCHER, a citizen of the United States, residing at Chicago, in the county of Cook and State of Illinois, have invented certain new and useful Improvements in Shower-Bath Hose, of which the following is a specification.

My invention relates to improvements in shower-bath hose; and it consists in so forming the hose that the openings through which the several jets or streams of water flow are held away from the neck or portion of the body to which the hose is applied.

In the accompanying drawings I have shown preferred embodiments of my invention in the following views.

Figure 1:
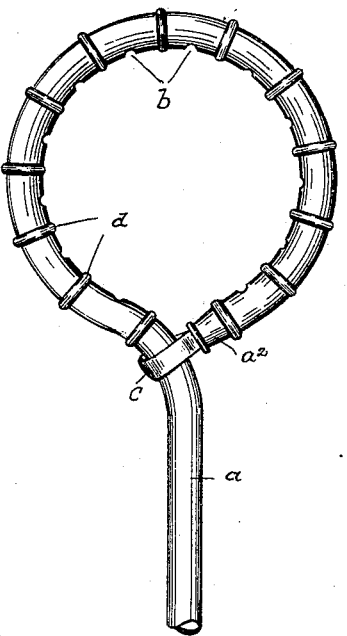
Figure 2:
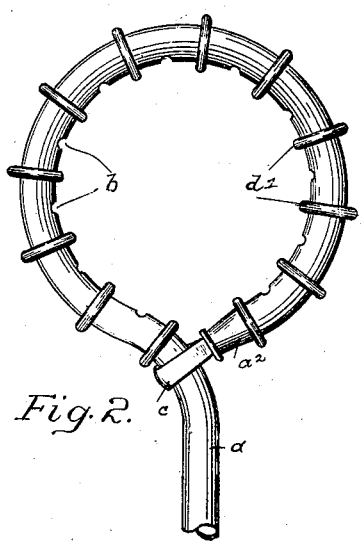
Figure 3:
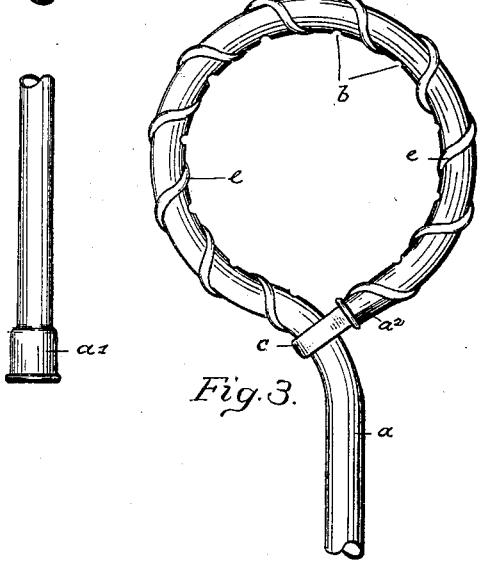

Figure 1 is a view in elevation of one form of hose involving my invention. Fig. 2 is a modified view of the same; and Fig. 3 shows another modification, which, however, involves the same principle and operates in the same manner as the forms shown in the other views.

In the bath-hose adapted to encircle the neck of the bather the holes through which the water flows are in some instances covered by the flesh, so that the stream is checked or diverted from a downward direction to an upward direction, thereby impairing the efficiency of the device for bathing purposes or causing discomfort to the bather.

The primary object of my improvement is to avoid the difficulties above mentioned.

In the drawings, $a$ represents a length of rubber tubing such as is commonly used for bath-hose and in which are formed holes $b$, through which the water flows under pressure from the spigot to which the end of the hose $a'$ is applied. On the end $a^2$ of the hose, which is closed in any suitable manner, is secured a flexible strap $c$, formed in the shape of a loop and adaped to fit snugly over the tube, so that it will remain in a position in which it is placed without slipping down or up on the tubing. This strap is preferably made of rubber. As shown in Fig. 1, a portion of the tubing which is adapted to encircle the neck of the bather is formed with a series of annular projections $d$, which are placed alternately with the holes in the tubing, so that each hole is flanked with a projection, thus holding the portion of the tube in which the hole is punched away from the neck or body of the bather.

Instead of forming the projections $d$ integrally with the tubing I may accomplish the same result by applying rubber rings $d'$ to the tubing, as shown in Fig. 2, or I may wrap the tubing with a cord, as $e$, in spiral convolutions, as shown in Fig. 3. It will be apparent that still other means may be adopted for holding the body of the tubing away from the neck of the bather, so as to allow the free exit of the water through the openings $b$. I therefore do not wish to be limited to any specific method of accomplishing this result, and

What I claim, and desire to secure by Letters Patent, is—

1. A hose having formed therein a series of openings and provided with projections between said openings.

2. A hose having formed therein a series of openings and having annular integral projections between said openings, substantially as set forth.

3. A hose provided with a series of openings and with a series of rings arranged intermediate said openings.

4. A hose provided with a series of openings and with projections intermediate said openings and a flexible loop secured to one end of the hose and adapted to embrace the hose, substantially as shown.

In testimony whereof I affix my signature in presence of two witnesses.

ORLAND C. FLETCHER.

Witnesses:
 F. BENJAMIN,
 WM. B. MOORE.